June 24, 1958 T. G. HART 2,840,679
CONTROL FOR SURFACE HEATING ELEMENT
Filed Dec. 23, 1955 3 Sheets-Sheet 1

Inventor
THOMAS GORDON HART
By: Maybee & Leglis
Att'ys

Inventor
THOMAS GORDON HART
By: Maybee & Legris
Att'ys

June 24, 1958 T. G. HART 2,840,679
CONTROL FOR SURFACE HEATING ELEMENT
Filed Dec. 23, 1955 3 Sheets-Sheet 3
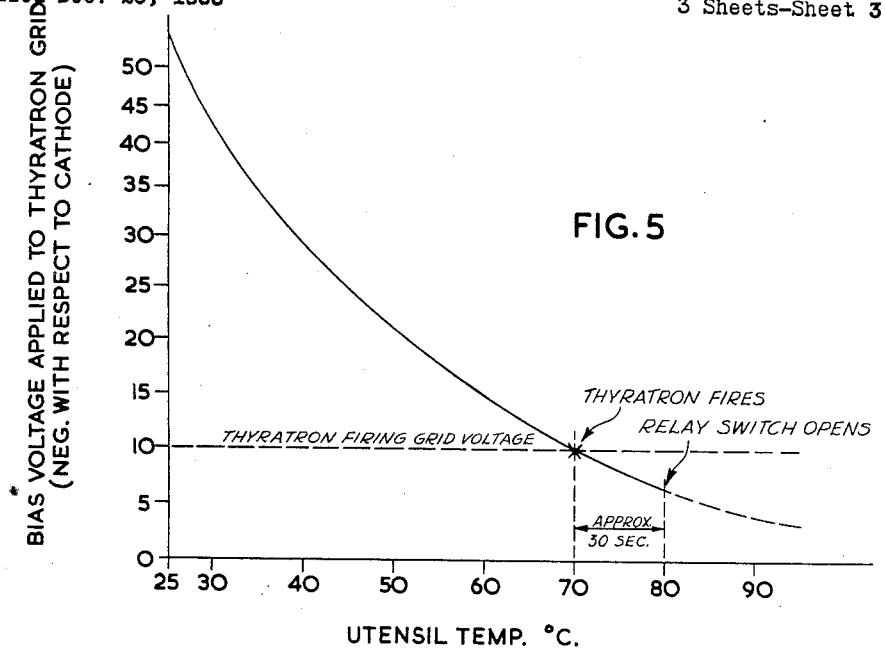
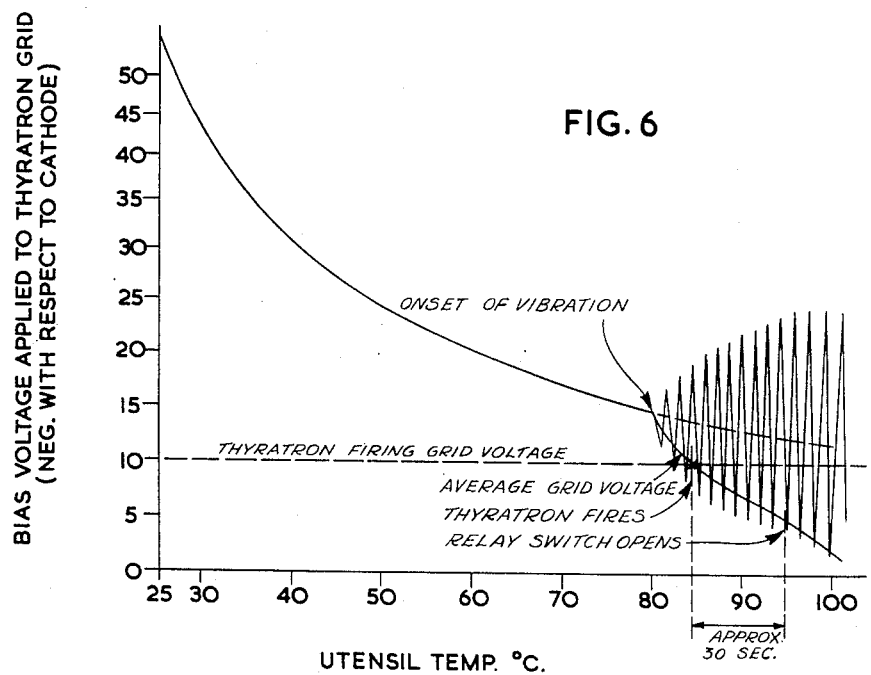
Inventor
THOMAS GORDON HART
By: Maybee & Legris
Att'ys United States Patent Office 2,840,679
Patented June 24, 1958

2,840,679

CONTROL FOR SURFACE HEATING ELEMENT

Thomas Gordon Hart, Toronto, Ontario, Canada, assignor to Moffats Limited, Weston, Ontario, Canada, a corporation Application December 23, 1955, Serial No. 555,130

9 Claims. (Cl. 219—20)

This invention relates to a method and means for controlling a heating element, and is particularly concerned with the control of a top or surface element of a cooking range.

Considerable effort has been and is still being expended in attempting to design a surface element control which has its operative parts located out of the way, which can be adjusted by a conveniently located switch, and which will provide accurate regulation of the temperature of the contents of a utensil set upon the surface element. Many controls employ thermostats or temperature sensitive resistors influenced directly by the temperature of the bottom of the utensil, but due to variations in the shape and cleanliness of utensil bottoms these controls are subject to errors which make it almost impossible to set and maintain the temperature of the contents of the utensil within the desired narrow range, particularly for the control of boiling. In many surface element controls elaborate circuitry is employed to approach the desired accuracy.

It is an object of the invention to provide a method and means capable of controlling accurately the temperature of the contents of a utensil, particularly one set upon a surface element. A further object is to provide a control device that is capable of adjustment for different temperatures, and that is not expensive or cumbersome and can be installed without difficulty and inconvenience in a cooking range. The invention is particularly concerned with the control of boiling.

Briefly, the invention contemplates the use of an electrical device sensitive to mechanical vibrations in the utensil, the vibrations being determinative of the temperature of the contents of the utensil. This will be better understood from the following description of a preferred embodiment of the invention illustrated in the accompanying drawings, wherein:

Fig. 5 is a graph showing the variation of grid control voltage of the thyratron of Fig. 4 as the surface element heats up with the control apparatus set to provide a utensil temperature of about 80° C.; and Fig. 6 is a similar graph with the apparatus set for boiling temperature.

Figure 1:
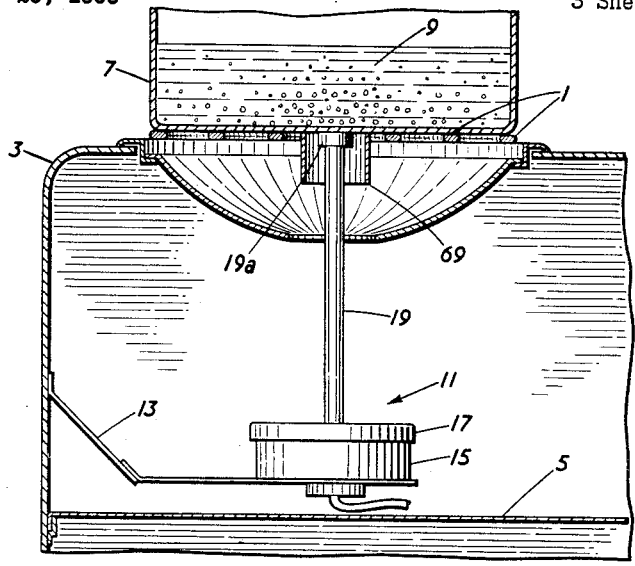
Fig. 1 is a vertical section through part of a range showing a surface heating element, a utensil on the element, and, in contact with the bottom of the utensil, a head unit for controlling the energization of the element.
Figure 2:
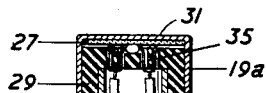
Fig. 2 is a vertical section, to an enlarged scale, through the head unit of Fig. 1, part of the unit being broken away.
Figure 2:
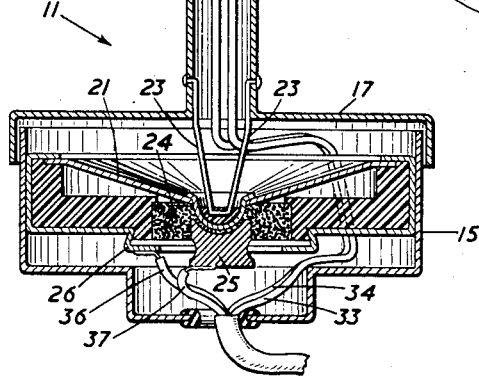

Fig. 1 shows a conventional surface element 1 for an electric range 3 having a dripshield 5 that may be removed for cleaning. A utensil 7 is shown resting on the element 1, and in Fig. 1 it is assumed that the element 1 has been in operation for some time, so that disturbances are occurring in the water 9 in the utensil due to expulsion of air or to actual boiling of the water. These disturbances set up vibrations in the utensil and the vibrations may be used by the present invention to control the energization of the element 1.

A head unit 11 is supported above the dripshield 5 by means of a resilient and flexible metal support 13. The unit consists of a transducer 15 and a metal cover 17 having a central rigid tube 19 which extends up through the center of the element. By means of a cap 19a rigidly secured to its upper end, the tube 19 engages the bottom of the utensil 7.

The transducer 15 illustrated is similar to a conventional telephone transmitter from which the perforated cover over the diaphragm 21 has been removed; precautions should be taken in the design of the transducer to ensure that it can withstand the rather severe conditions that may occur in a range. Also the cover 17 may preferably be shaped to shed drips from above. Rods 23 from the center of the diaphragm support the cover 17 and tube 19. The cover 17 fits loosely over the transducer 15 so that mechanical vibrations transmitted down the tube 19 from the bottom of the utensil 7 are passed down the rods 23 to the diaphragm 21. The resilient, flexible support 13 and the rods 23 ensure that the cap 19a is pressed against the bottom of the utensil.

The vibrations transmitted from the utensil 7 via the tube 19 to the diaphragm 21 cause variations in resistance of carbon granules 24 between the terminals 25, 26 of the transducer 15, and as will be described with reference to Fig. 4 these variations in resistance cause an alternating voltage which may be rectified, smoothed and used in controlling the supply of current to the surface element 1. The construction of telephone transmitters and like transducers being well known, no further description of the precise construction of the transducer 15 is thought necessary.

The cap 19a of the tube is preferably made of copper having its outer surface chromium plated. Below the cap is a mica disc 27, and below that a holder 29 of electrical insulating material, for example, silicone rubber. The upper surface of the holder 29 has a central recess into which is set a thermistor 31 (a resistor having a negative temperature coefficient of resistance) of the glass bead type. Leads 33, 34 from the thermistor are threaded up and down through holes 35 in the holder and then pass down through the tube 19 and around the transducer 15 to the control circuit of Fig. 4.

Figure 4:
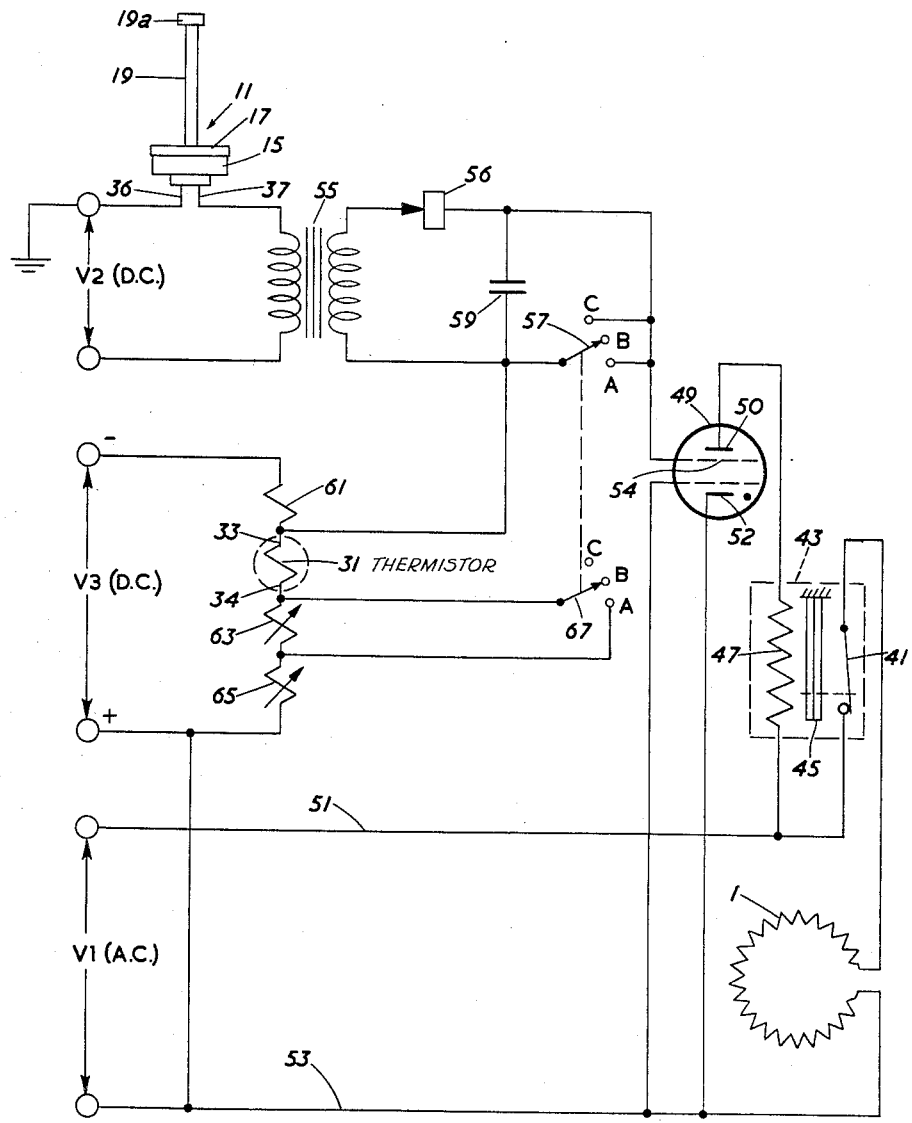
Fig. 4 is a schematic wiring diagram of the apparatus that controls the energization of the surface heating element.

In Fig. 4 the thermistor 31 is, for clarity, shown separately from the unit 11. Thus, in Fig. 4, the only leads seen leading from the unit 11 are leads 36, 37 from the terminals 25, 26 of the transducer.

As shown in Fig. 4, the surface heating element 1 is connected, through a normally closed switch 41 of a thermal relay 43, across a 230 volt alternating current source $V_1$. The relay 43 includes a bimetallic strip 45 which controls the opening and closing of the switch 41, the strip having a heater 47. Heater 47 forms the plate load of a thyratron tube 49, the plate 50 of the thyratron being connected through the heater 47 to one side 51 of the alternating current source $V_1$, and the cathode 52 of the thyratron being connected to the other side 53 of the source $V_1$.

The transducer 15 and the thermistor 31 are connected in the circuit of the control grid 54 of the thyratron. The transducer 15 is connected by its leads 36, 37, in series with the primary winding of a voltage step-up transformer 55, across a 6 volt direct current source $V_2$. The secondary winding of the transformer 55 is connected, at one end, through a rectifier 56 to the grid 54, and at the other end to the pole of a switch 57 having three contacts A, B and C. The contacts A and C are connected to grid 54; the middle contact B is a dummy. A smoothing capacitor 59 is connected across the secondary winding of transformer 55 and the rectifier 56.

The thermistor 31 is connected, by one of its leads 33, through a fixed resistor 61 to the negative side of a 150 volt direct current source $V_3$. Lead 33 is also connected to the pole of switch 57. The other thermistor lead 34 connects the thermistor through two variable resistors 63 and 65 to the positive side of source $V_3$, and this positive side is connected via the line 53 to the cathode 52 of the thyratron. A switch 67 is ganged to the switch 57 and, like switch 57, has three contacts A, B and C. Contacts B and C of switch 67 are dummies, but its contact A is connected to one side of the variable resistor 63 and its pole is connected to the other side of the variable resistor 63.

The circuit of Fig. 4 permits the utensil 7 to be held at one of three different temperatures, for example, warming at 80° C., frying at 180° C., or boiling at 100° C. For warming, the switches 57 and 67 are moved to their contacts A, and for frying (for which there is of course no water in the utensil 7) the switches are moved to their contacts C. At these positions, switch 57 shorts out the circuit from the transducer 15, so that control at the warming and frying temperatures is obtained by the temperature/resistance characteristics of the thermistor alone.

With the switches 57 and 67 set at their contacts A, for warming, the bias voltage applied to the thyratron control grid 54 is equal to the voltage drop across the thermistor 31 and the variable resistor 65 (resistor 63 being shorted out), and when the utensil and thermistor are cool (say 25° C.: Fig. 5) this bias is more than sufficient to prohibit current flow through the thyratron. When the utensil temperature reaches about 70° C. the resistance of the thermistor has reduced sufficiently to reduce the bias to the level at which the thyratron fires at the peak of its positive half cycle from the A. C. source $V_1$. Current then flows through the heater winding 47 of the thermal relay 43. The thermal relay has a slight delay, say 30 seconds, so that if the bimetallic element 45 was initially cool about 30 seconds elapse before the element 45 opens the switch 41 and cuts off power to the surface element 1. This sequence is shown graphically in Fig. 5.

When the power to element 1 has been cut off, the utensil 7 and thermistor 31 cool, and the control grid bias increases until the thyratron cuts off. After a delay the relay switch 41 recloses and power is again supplied to the element 1. The temperature of the utensil then proceeds to cycle about the 80° C. control point, the length of its "on" and "off" periods being determined largely by the thermal capacity of the utensil and its contents.

With the switches 57 and 67 at contacts C, the resistor 63 is included in the grid bias circuit so that the thermistor 31 must reach a higher temperature before the thyratron fires, and therefore, the utensil cycles about a central temperature of, say, 180° C.

To boil water 9 in the utensil 7, the switches 57 and 67 are set at contacts B so that the circuit from the transducer 15 is not shorted out. At room temperature there are no vibrations from the utensil, and the control grid bias is, as in the case when the control was set for frying, well above that at which the thyratron will fire (Fig. 6). As the utensil warms up to about 80° C., if the water 9 contains air (as it usually does) the utensil will start vibrating, the frequency of vibration being determined by the physical characteristics of the utensil. The vibrations cause the resistance of the unit 15 to vary, and the variations in resistance across the direct current source $V_2$ cause variations in the current through the primary winding of the transformer 55. By means of the rectifier 56 and smoothing capacitor 59 the variations are converted to a direct voltage which, being added to the voltage tapped across the thermistor 31 and resistors 63 and 65, rapidly decreases the bias of the thyratron control grid 54, hastening the firing of the thyratron as shown in Fig. 6. After the normal delay time of the relay 43 the element 1 is disconnected from the power supply $V_1$. During the delay time the element 1 has supplied further heat to the utensil and when the element is disconnected the temperature of the utensil is somewhat greater than it was at the instant the thyratron fired. The temperature has probably not yet reached 100° C., but depending on the thermal capacity of the utensil and its contents the temperature will usually reach 100° C. during the next "on" period of the element 1. Thereafter the cycling process repeats itself indefinitely, with the action of true boiling supplying the vibrations, until either the device is switched off or the water boils away. If the water boils away the conditions are similar to those existing when the switches were at contacts C, and the highest temperature to which the utensil can be raised is the frying temperature. Thus the thermistor protects the utensil in the event that it boils dry.

The transducer 15 is responsive to mechanical vibrations and does not depend for its operation upon good thermal contact with the bottom of the utensil. For control of boiling it does not much matter whether the bias voltage due to the thermistor 31 is considerably different from that shown in the gradual curve of Fig. 6, since, with the onset of vibration, the bias voltage is soon reduced sufficiently to cause the thyratron to fire. In other words, the vibrations in the utensil are sufficiently strong that regardless of the thermistor temperature the thyratron fires soon after the commencement of the vibrations. It is, therefore, immaterial that the thermal contact of the thermistor with the utensil may vary considerably depending on the condition of the utensil bottom. For control of boiling, the thermistor could obviously be dispensed with, the bias normally applied to the thyratron being such that vibrations alone will cause the tube to fire, but use of the thermistor for boiling is desirable to reduce the sensitivity of the apparatus when cold, preventing premature firing of the thyratron, and also to restrict the temperature of the utensil to frying temperature should the utensil boil dry.

Figure 3:
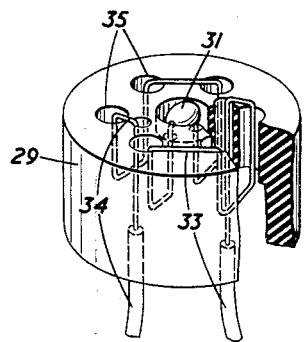
Fig. 3 is a perspective, partly sectional view, to a still larger scale, of the thermistor holder and thermistor at the top of the head unit.

The thermistor is the sole control for warming and for frying, but warming and frying temperatures are not nearly so critical as boiling temperatures and consequently the thermistor alone is sufficiently accurate, despite variations in its thermal contact with the utensil. It is of course desirable to have as good thermal contact as possible with the bottom of the utensil, and the construction shown in Figs. 1 and 3 is designed to promote this. Thus, the thermistor 31 is in good thermal contact with the cap 19a through the mica disc 27, and the transfer of heat to the thermistor is enhanced by the manner in which the leads 33, 34 are threaded through the holder 29 so as also to be in contact with the disc 27.

It is desirable to provide an annular shield or baffle 69 (Fig. 1) on the range around the tube 19 to minimize direct radiation to the thermistor from the element 1.

The values of the variable resistors 63 and 65, which determine the warming and frying temperatures, are normally set at the factory so that the only external control provided for the housewife is a knob for manipulating the ganged switches 57 and 67.

It is possible to eliminate the rectifier 56 and capacitor 59 so that the thyratron fires in response to A. C. pulses from the unit 15. Many other modifications can of course be made in the apparatus and method, and it is to be understood that these are contemplated without departing from the spirit and scope of the invention as defined in the appended claims.

What I claim as my invention is:

1. For heating a utensil containing liquid, the combination of a heating element, means for regulating the heat output of the heating element, a control unit including a transducer of the kind that causes a variable electrical output voltage in response to a vibratory mechanical input, the transducer having a movable part for receiving the mechanical input and having electrical output leads, the unit also including a mechanically vibratable member connected to said movable part, means for pressing the unit against the utensil with the vibratable member having a part in contact with the utensil to receive vibrations therefrom, electrical means connected to said output leads and responsive to said variable electrical output voltage for operating said heat output regulating means, and a thermoresponsive element on the vibratable member adjacent said utensil contacting part for causing a thermally variable voltage, said electrical means being connected to said thermoresponsive element, said electrical means including an electronic tube having a control grid to which said voltages are applied, and said heat output regulating means being an electrical relay operated by said tube.

2. A control for regulating the temperature of a utensil containing liquid, the utensil being heated by a heating element having means for regulating its output, the control comprising a transducer of the kind that causes a variable electrical output voltage in response to a vibratory mechanical input, mechanically vibratable transducer input means for contacting the utensil to receive vibrations therefrom, thermoresponsive means of the kind that cause a variable electrical output voltage in response to heating and located where the thermoresponsive means are heated with the utensil, the transducer and thermoresponsive means having electrical output leads, and electrical means connected to said output leads and responsive to said variable electrical output voltages for operating said heat output regulating means, said electrical means including an electronic tube having a control grid to which said voltages are applied.

3. A control for regulating the temperature of a utensil containing liquid, the utensil being heated by a heating element having means for regulating its output, the control comprising a unit for causing electrical voltages in response to the temperature of and vibrations in the utensil, the unit including a mechanically vibratable member, a thermistor on said member, and a transducer, an electrical circuit including the thermistor and the transducer, said member having a thermally conductive part, the thermistor being adjacent but electrically insulated from said part, means for pressing said member against the utensil with said part contacting the utensil to cause the thermistor to be heated by the utensil and said member to vibrate in response to vibrations of the utensil, the thermistor causing a thermally variable voltage in said circuit, the transducer being mechanically operable by the vibrations of said member to cause another variable voltage in said circuit dependent upon vibrations of the utensil, and means responsive to said voltages for operating said heat output regulating means.

4. A control for regulating the temperature of a utensil containing liquid, the utensil being heated by a heating element having means for regulating its output, the control comprising a transducer of the kind that causes a variable electrical output voltage in response to a vibratory mechanical input, mechanically vibratable transducer input means for contacting the utensil to receive vibrations therefrom, thermoresponsive means of the kind that cause a variable electrical output voltage in response to heating and located where the thermoresponsive means are heated with the utensil, the transducer and thermoresponsive means being electrically connected together and having electrical output leads for their combined output voltages, and electrical means connected to said output leads and responsive to said combined output voltages for operating said heat output regulating means.

5. A control as claimed in claim 4, wherein the thermoresponsive means are located on said utensil contacting transducer input means.

6. A control as claimed in claim 4, wherein the thermoresponsive means comprise a temperature sensitive resistor.

7. A control as claimed in claim 6, wherein said resistor has a negative temperature coefficient of resistance.

8. A control as claimed in claim 6, wherein said transducer and said resistor are connected together in series.

9. A control as claimed in claim 8, wherein said electrical means include an electronic tube having a grid to which said combined voltages are applied.

References Cited in the file of this patent

UNITED STATES PATENTS

| | | |
|---|---|---|
| 1,663,810 | Morse | Mar. 27, 1928 |
| 2,031,919 | Bennet et al. | Feb. 25, 1936 |
| 2,099,687 | Hartig | Nov. 23, 1937 |
| 2,556,065 | Callender | June 5, 1951 |
| 2,667,560 | Clark | Jan. 26, 1954 |
| 2,727,129 | Davis | Dec. 13, 1955 |
| 2,757,869 | Ray | Aug. 7, 1956 |